United States Patent [19]
Campau

[11] Patent Number: 6,003,840
[45] Date of Patent: Dec. 21, 1999

[54] FLOW CONTROL VALVE FOR USE WITH BOAT WATER DISTRIBUTION APPARATUS

[75] Inventor: Daniel N. Campau, Grand Rapids, Mich.

[73] Assignee: Flow-Rite Controls, Ltd., Grand Rapids, Mich.

[21] Appl. No.: 09/075,672

[22] Filed: May 11, 1998

[51] Int. Cl.$^6$ ........................................................ F16K 5/06
[52] U.S. Cl. ................................ 251/304; 114/255; 43/55
[58] Field of Search ..................................... 114/197, 198, 114/255, 343; 43/55, 56, 57; 251/304

[56] References Cited

U.S. PATENT DOCUMENTS 4,589,441  5/1986  Campau .
4,708,084  11/1987  Campau .
5,236,175  8/1993  Campau .

*Primary Examiner*—John Fox
*Attorney, Agent, or Firm*—Niro, Scavone, Haller & Niro

[57] ABSTRACT

Improved elastomeric valve seal members for use in a water distribution system between a water source and, for example, a baitwell or a livewell in a boat. The elastomeric seal members are made from material resistant to deterioration from engine exhaust gases, increasing overall reliability and longevity of the water distribution system.

4 Claims, 2 Drawing Sheets

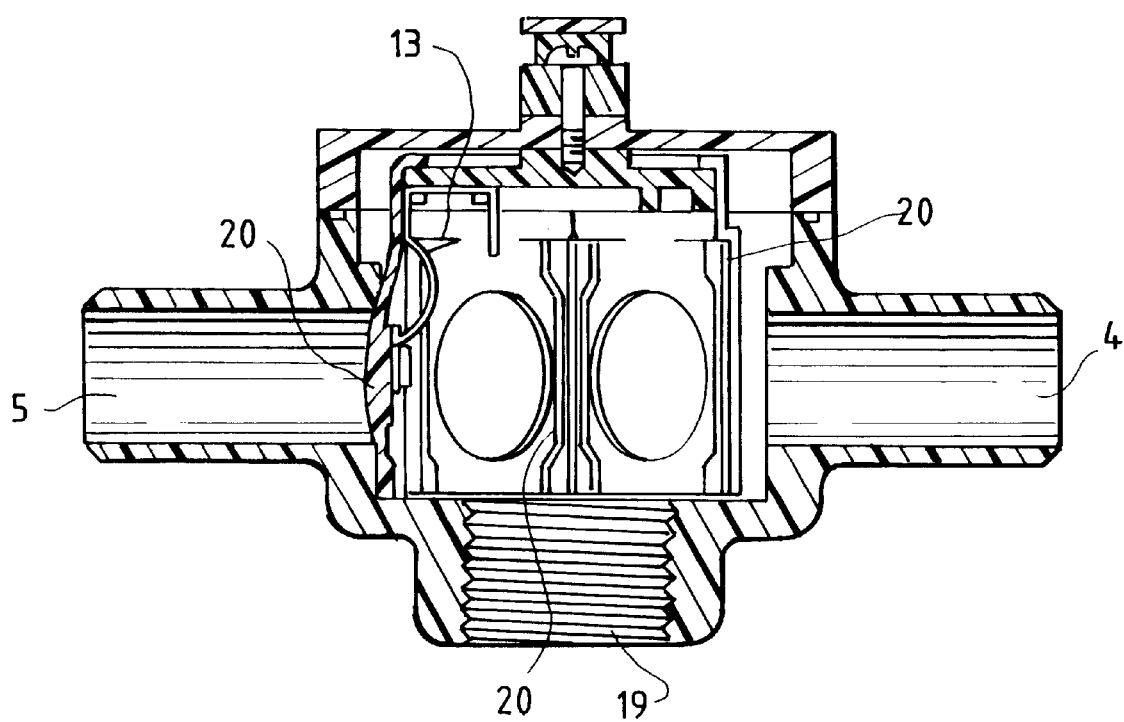

FLOW CONTROL VALVE FOR USE WITH BOAT WATER DISTRIBUTION APPARATUS

BACKGROUND OF THE INVENTION

U.S. Pat. Nos. 4,589,441, 4,708,084, and 5,236,175 are hereby incorporated by reference into this disclosure.

The present invention relates to systems and valves for controlling the flow of water between a reservoir, such as a livewell on a fishing boat, and a water source, such as a lake or river. More specifically, the invention relates to an improvement in the material of which such valves are made.

The water distribution and valve systems disclosed in U.S. Pat. Nos. 4,589,441, 4,708,084, and 5,236,175 represent typical prior art apparatus for controlling the flow of water into and out of fishing boat baitwells and livewells. Water is drawn through a flow control valve by a pump which then directs water flow to the livewell inlet. These patents disclose various valve arrangements and functions which provide enhanced operator control during livewell filling, recirculation and draining. The disclosure of U.S. Pat. Nos. 4,589,441, 4,708,084 and 5,236,175 are incorporated herein by reference.

Systems and valves made in accordance with these patents are widely used by many manufacturers of sport fishing boats. For example, most bass fishing boats built today incorporate a livewell system manufactured under one or more of these patents. While these systems and valves have performed well, the eventual deterioration of the valve seal material used in the control valve has been a recurring problem.

A thermoplastic elastomer used for the valve seal has provided a desirable combination of properties which has met the known operating conditions and performance requirements of the system and valves. The chemical resistance of the thermoplastic elastomer material was, according to known specifications, suitable for the application. While most systems have performed reliably for many years, as the number of boats using this type of system have increased, so have the number of valve seal material failures. The eventual failure of elastomeric seals is generally expected and tolerated by boat owners as a maintenance item. The repair of the valves, however, is difficult due to the generally inaccessible location of the valve in the boat bilge. Thus eliminating this problem has become important to both boat manufacturers and dealers.

The failure of the valve seals was studied in an effort to determine the cause of the problem. Many possible chemical contaminants were evaluated. Mold release agents used in the manufacture of fiberglass and plastic livewell tanks, and antifreeze used to flush out the livewell to winterize the boat were considered but were not found to be the problem. Herbicides and insecticides used in treating lakes and waterways and livewell additives such as tranquilizers used to calm fish were also not found to be a factor. Samples of the failed valve seals were examined and the characteristics of the failures (hardening and shrinking) were typical of heat aging failures. But while temperatures in the bilge of the boat can exceed over 100° F. for extended periods, the valve seal failures occurred in cooler northern climates as well as in hotter southern locales.

Only after examination of the potential causes for the valve seal failures over several years was the cause finally identified. One model valve, using the same valve seal material as the other valves, had no failure. This valve, however, was used only to drain the livewell. No outside water was drawn through it. Thus, something in the outside water was thought to cause the failures. Initial speculation was that engine exhaust gases or gasoline fumes, concentrated in the low pressure area behind the boat, were being drawn into the livewell system along with the water.

Tests conducted upon the valve seal material that was conventionally used with these valve systems (a thermoplastic elastomer) showed that the material was undergoing a slight swelling followed by a substantial shrinkage and hardening of the material. This swelling/shrinkage phenomenon mimicked the actual failures of the valve seals in the field. Further testing revealed that gasoline was leaching out the plasticizer in the elastomer, causing dramatic failure. In other words, a relatively low concentration of gasoline fumes, over time, was in fact causing the seal to gradually deteriorate.

Materials resistant to exposure to gasoline were considered as replacements for the seal material. However, the material also needed to possess desired attributes of flexibility and ease of manufacture. O-rings are commonly made from nitrile and used in marine valves, as it is typically stocked by suppliers for this application. However, thermoplastic elastomers have conventionally been employed as the valve seal or "flapper" material because they permit lower cost tooling and provide easier design configuration changes, while also being processed cheaper than thermoset materials such as nitrile.

Thermoset synthetic rubbers were then identified as the most desirable materials for fabricating the valve seals/flappers. These include nitrile and flouropolymer thermosetting resins, with nitrile being the preferred choice as it can be readily and economically molded. The use of nitrile as the valve seal material has eliminated the field failures previously encountered. With no material failures, the reliability, longevity, and customer satisfaction of the livewell/baitwell systems employing these valves has been enhanced.

SUMMARY OF THE INVENTION

These and other advantages are provided by the present invention, which maintains all the advantages of the water distribution systems described in U.S. Pat. Nos. 4,589,441, 4,708,084, and 5,236,175, while overcoming the disadvantages already described.

An object, therefore, of the present invention is to provide a water distribution system for use in petroleum contaminated environments; in which the elastomer seal members within the flow control valve are made from a material which will not deteriorate under exposure to such environments; while maintaining the attributes of flexibility and manufacturability possessed by thermoplaster elastomers. This objective is achieved by using thermoset synthetic rubbers in the fabrication of the valve seal.

The present invention entails a change in the material used for the seals or flappers within the valves of livewell/baitwell systems. Employing thermoset synthetic rubbers allows the valve seal to better withstand exposure to gasoline present in the water or the engine exhaust gases. Using a thermoset synthetic rubber such as nitrile or flouropolymer for the valve seal also provides the same benefits of flexibility and manufacturability previously obtained with the use of thermoplastic elastomers, while gaining the benefits of a material that will not substantially deteriorate from the exposure to the petroleum based contaminants in the water supply. Specifically, Buna-N material with a 60 Shore-A durometer is the preferred elastomeric material.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with the accompanying drawings, in which:

FIG. 3 is a cross-sectional side view of a three-position flow control valve showing the elements therein.

DETAILED DESCRIPTION OF THE PREFERRED EMBODIMENTS

Figure 1:
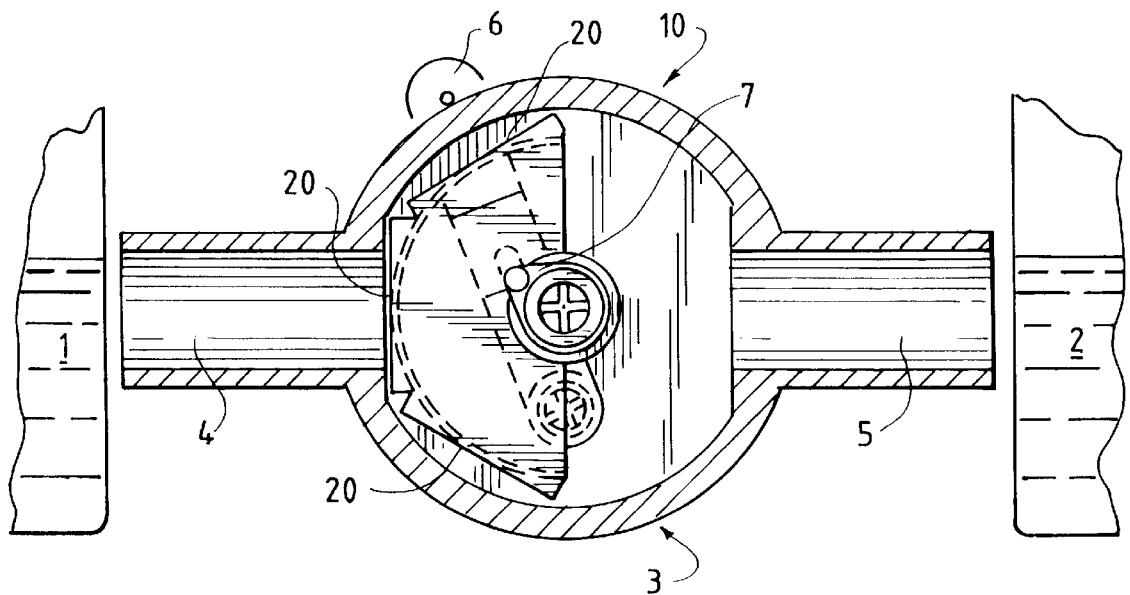
FIG. 1 is a cross-sectional top view of a flow control valve according to the present invention which communicates with two water reservoirs.
Figure 2:
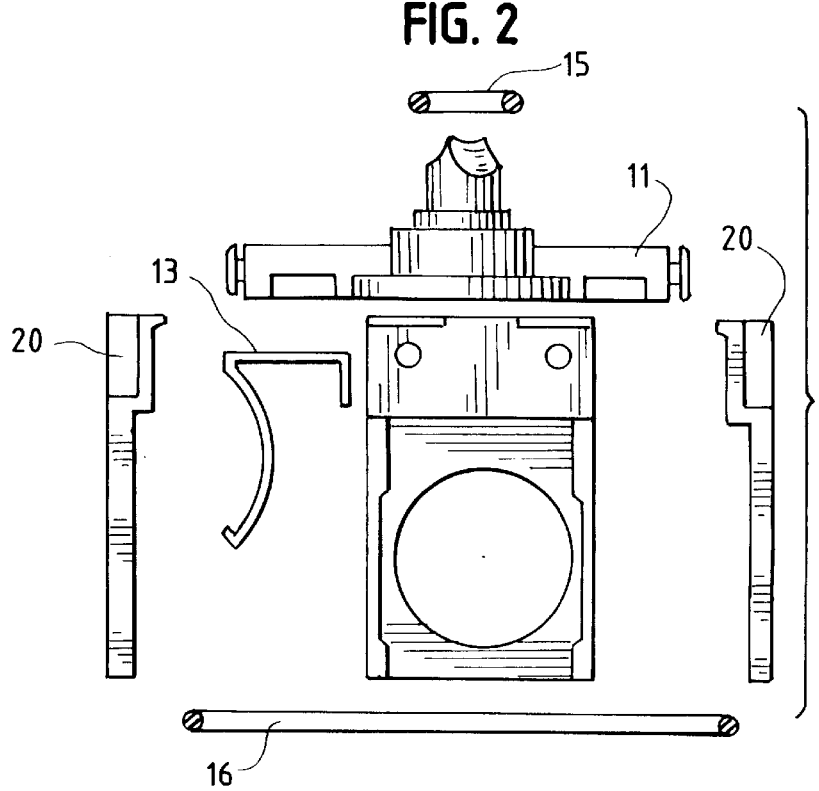
FIG. 2 is an exploded view of the valve chamber shown in FIG. 1, and the elements therein.

Referring to the drawings, a three-position livewell control valve 3 is shown with rotating arm 6, elastomeric seal members or flappers 20, spring 13, rotor assembly 11, o-rings 15, 16, and pipe 19 (in fluid communication with a pump, not shown) each of whose function should now be appreciated but which are explained completely in U.S. Pat. No. 5,236,175. Referring now to FIG. 1, it can be seen that water flowing through system 10 in various directions can flow from either outside source 1 or livewell 2, depending upon the configuration of elastomeric seal members or flappers 20 (see also FIG. 2) within flow control valve 3. Pipe 4 of system 10 may be located at the rear of the boat. Gasoline present in the outside water or in the exhaust gases may be drawn into system 10 through pipe 4 along with the water intended for livewell 2. This is due, in part, to the location of pipe 4 at the rear of the boat, near its engine(s). Pipe 5 leads to livewell 2. Elastomeric seal members 20 within valve 3 are exposed to gasoline, even in small amounts flowing through system 10.

In the preferred embodiment, elastomer seal members 20 are made from a material resistant to exposure to gasoline or other petroleum based contaminants drawn into valve 3 from outside source 1. Such materials consist of thermoset synthetic rubbers such as nitrile or flouropolymer materials. Buna-N material with a 60 Shore-A durometer is the preferred elastomeric material.

It will be understood that the invention may be embodied in other specific forms without departing from its spirit or central characteristics. The present examples and embodiment, therefore, are to be considered in all respects as illustrative and not restrictive, and the invention is not to be limited to the details here. Changes and modifications can be made without departing from the spirit and scope of the present invention and without diminishing its intended advantages. It is, therefore, intended that such changes and modifications be covered by the following claims.

What is claimed is:

1. An apparatus for controlling the flow of water between a reservoir on a boat a the body of water external to the boat, comprising:

a flow control valve including at least one elastomeric flapper seal member in fluid communication with the external water and wherein said external water contains petroleum based contaminants, said elastomeric seal being fabricated from a material resistant to deteriation from exposure to said petroleum based contaminants.

2. The apparatus of claim 1 wherein the material comprises a thermoset synthetic rubber.

3. The apparatus of claim 1 wherein the material comprises a nitrile elastomer.

4. The apparatus of claim 1 wherein the material comprises a flouropolymer elastomer.

\* \* \* \* \*